United States Patent [19]

Dumoulin et al.

[11] 4,247,420

[45] Jan. 27, 1981

[54] HYDROCARBON CONVERSION CATALYST PREPARATION

[75] Inventors: Joseph S. C. Dumoulin, Valleyfield, Canada; Mark A. Seese, Ellicott City; Edwin W. Albers, Annapolis, both of Md.

[73] Assignee: W. R. Grace & Co., New York, N.Y.

[21] Appl. No.: 23,429

[22] Filed: Mar. 23, 1979

[51] Int. Cl.$^3$ .................... B01J 21/12; B01J 21/16; B01J 29/08
[52] U.S. Cl. .................... 252/453; 252/455 R; 252/455 Z
[58] Field of Search .................... 252/453, 455 R, 455 Z

[56] References Cited

U.S. PATENT DOCUMENTS

| 3,124,541 | 3/1964 | Wilson, Jr. et al. | 252/453 |
| 3,210,294 | 10/1965 | Chomitz et al. | 252/453 |
| 3,410,808 | 11/1968 | Smith et al. | 252/453 |
| 3,433,748 | 3/1969 | Magee, Jr. et al. | 252/453 |
| 3,872,029 | 3/1975 | Takase et al. | 252/453 |
| 4,144,194 | 3/1979 | Guidry | 252/451 |

*Primary Examiner*—Carl F. Dees
*Attorney, Agent, or Firm*—Arthur P. Savage

[57] ABSTRACT

A dense, highly attrition resistant catalyst is prepared by reacting an alkali-metal silicate and aluminate under conditions which produce a thermally and hydrothermally stable cogel having a substantial surface area in pores ranging from about 25 to 75A°. The catalyst includes excess silicate obtained as a by-product from a Type Y zeolite synthesis.

7 Claims, 2 Drawing Figures

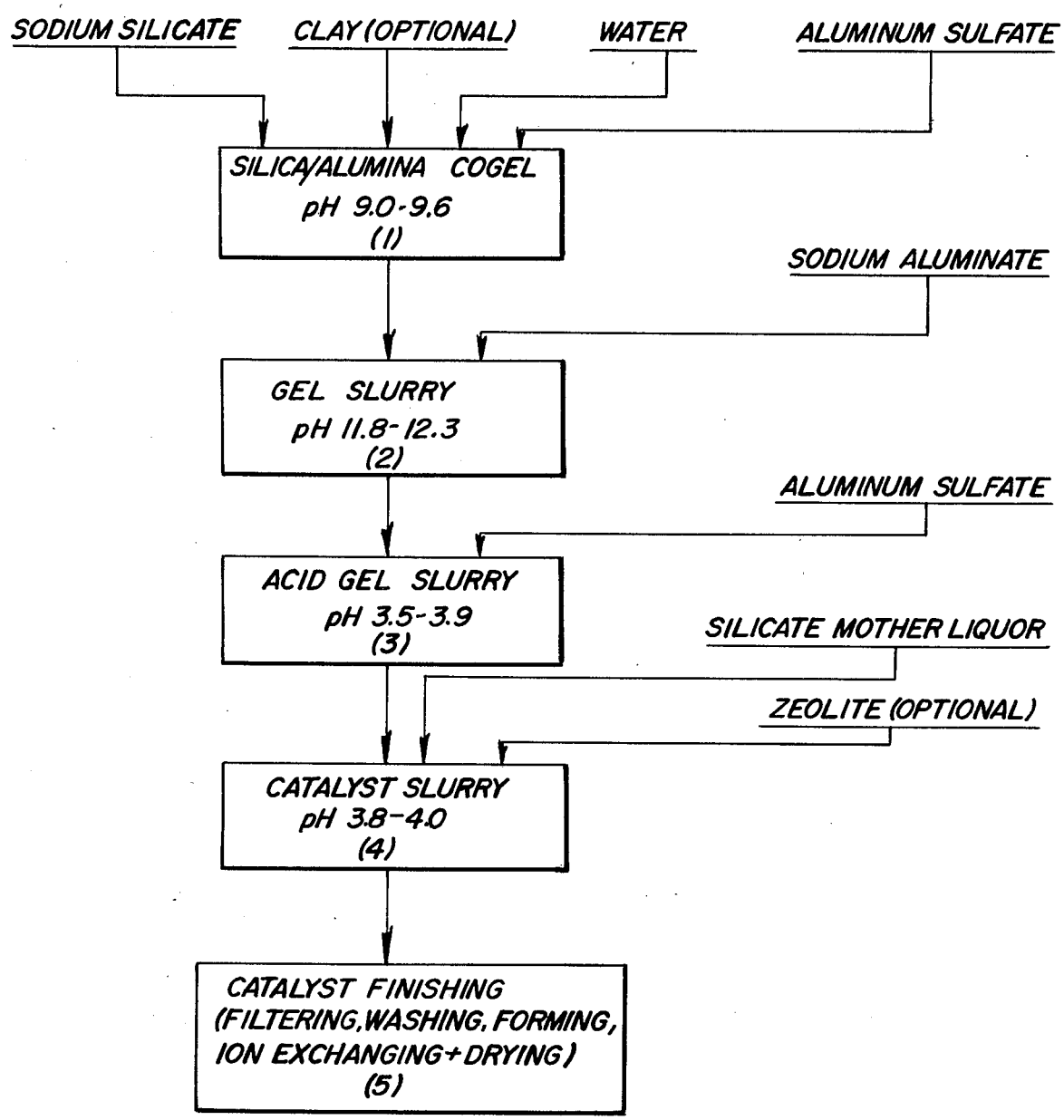

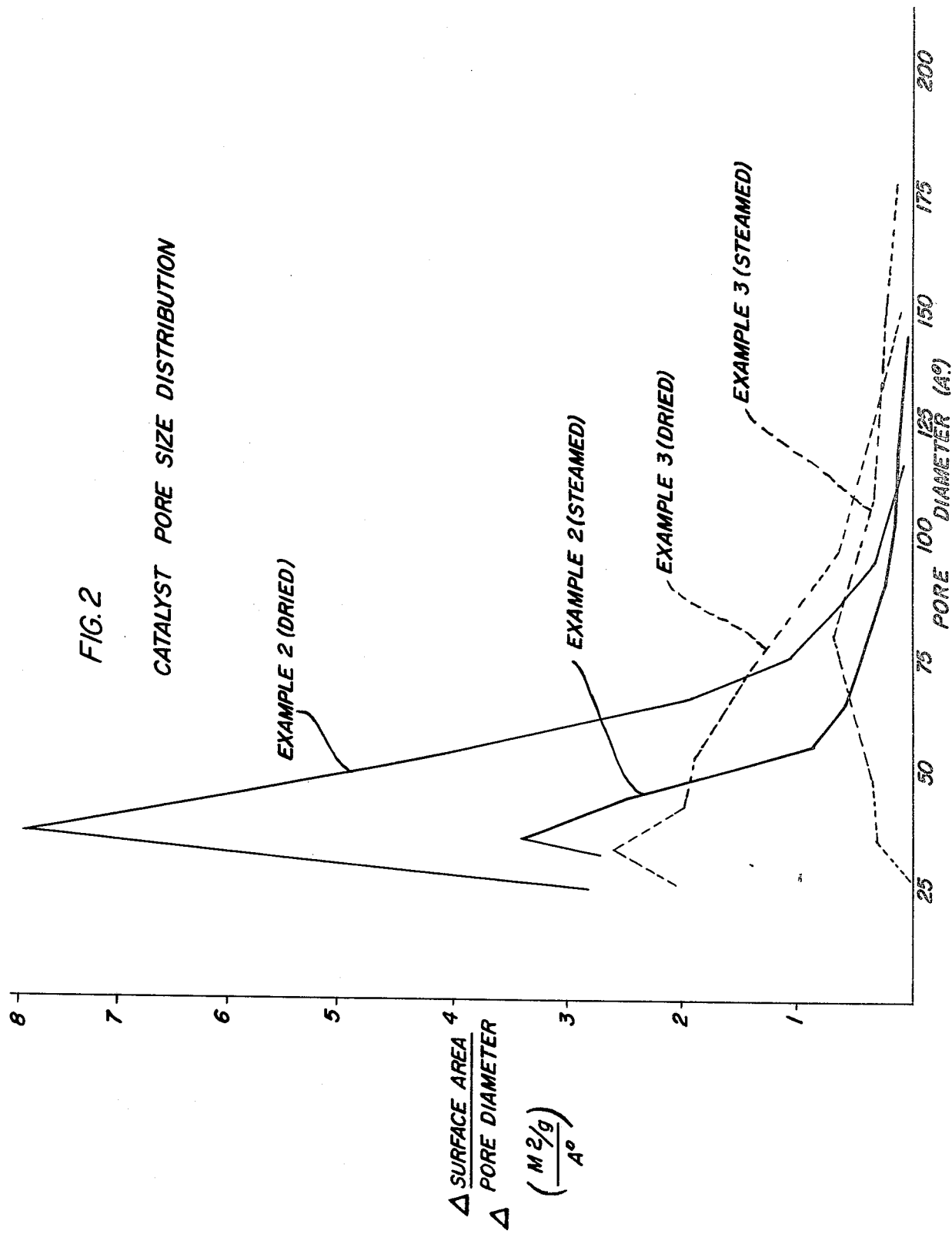

HYDROCARBON CONVERSION CATALYST PREPARATION

The present invention relates to the preparation of hydrocarbon conversion catalysts, and more specifically to a silica-alumina hydrogel fluid catalytic cracking catalyst which is dense, attrition resistant and thermally and hydrothermally stable and which may contain substantial quantities of clay and/or crystalline aluminosilicate zeolites.

Hydrocarbon conversion catalysts, which comprise silica-alumina hydrogel, are normally prepared by combining reactive forms of silica and alumina such as sodium silicate, aluminum sulfate and/or sodium aluminate. The physical and catalytic properties of a silica-alumina hydrogel catalyst are controlled not only by the quantity of the various reactive components but also by the procedure by which they are reacted.

U.S. Pat. No. 3,650,988 to Magee et al discloses a process for preparing low surface area, attrition resistant silica-alumina hydrogel catalysts. The catalysts are obtained by gelling an alkali metal silicate solution at a pH of about 9 to 12 by the addition of an acid salt. An alkali metal aluminate is then added to the gelled silicate and the mixture is aged prior to the addition of additional aluminum sulfate, which is added to impart the desired alumina concentration to the hydrogel. The pH of the hydrogel is adjusted to about 6–9 by the addition of ammonia, and zeolite is added. The resultant mixture is then washed, spray dried and ion exchanged in the conventional manner.

U.S. Pat. No. 3,912,619 to Magee et al discloses a process for preparing a low surface area, attrition resistant silica-alumina hydrogel catalyst wherein the majority of the pore volume is located in pores of about 45°–125A° in diameter. The catalysts are prepared by reacting sodium silicate with aluminum sulfate to obtain a gelled mixture having a pH of about 9.5–11. The mixture is aged for 5 to 60 minutes and combined with additional aluminum sulfate or sodium aluminate to obtain a hydrogel having a desired alumina concentration.

The commercially available hydrocarbon cracking catalysts heretofore available are highly active and relatively attrition resistant and dense. However, due to increasing emphasis on maintaining minimal catalyst losses to the atmosphere, there is a substantial demand for fluid catalytic cracking catalysts having still higher density and attrition resistance. Furthermore, it is highly desirable to develop methods for the manufacture of commercial quantities of catalyst which yield minimum quantities of pollution contributing effluents such as ammonia and/or alkaline metal silicate.

It is therefore an object of the present invention to provide an improved hydrocarbon conversion catalyst which is dense, attrition resistant and thermally and hydrothermally stable.

It is another object to provide a dense, attrition resistant fluid hydrocarbon cracking catalyst which contains zeolite and clay suspended in a silica-alumina hydrogel matrix.

It is a further object to provide a method of preparing Type Y zeolite containing cracking catalysts wherein excess by-product silicate produced in the zeolite synthesis is incorporated in the finished catalyst.

These and still further objects of the present invention will become readily apparent to one skilled in the art from the following detailed description and drawings wherein:

FIG. 1 is a flow chart which sets forth a catalyst preparation method of the present invention; and FIG. 2 is a graphical representation which illustrates the pore size distribution of catalysts prepared by way of the presently disclosed process.

Broadly, our invention contemplates the preparation of a hydrocarbon conversion catalyst which includes a highly stable, dense and attrition resistant silica-alumina hydrogel matrix which has a significant surface area in pores having diameters of from 25–75 A°.

More specifically, we have developed an improved catalyst which may be prepared by the novel procedure which is outlined in the flow diagram set forth in FIG. 1. Reference to FIG. 1 reveals that in step (1) of the process an aqueous solution of sodium silicate is reacted with aqueous solution of aluminum sulfate, and optionally clay, to obtain a silica alumina cogel reaction slurry having a pH of about 9.0 to 9.6, and preferably from about 9.0 to 9.2. The sodium silicate solution comprises sodium silicate having a mol ratio formula of from about 0.3 to 1 $Na_2O.SiO_2$ dissolved in water to a concentration of from about 3.5 to 5.5 percent by weight solids. The aluminum sulfate solution is prepared by combining sulfuric acid and alumina in a mol ratio of from about 1 to 3 $Al_2O_3.SO_4$. The sodium silicate and aluminum sulfate solutions are reacted in amounts which will produce a silica-alumina cogel reaction slurry having a pH of from about 9.0 to 9.6. In general it is found that the silica to alumina ratio of the slurry will range from about 15 to 20 and the slurry will contain from about 0.10 to 0.15 mols excess $Na_2O$ per mol of $SiO_2$. It is noted that clay may be added, preferably in the form of an aqueous slurry to the reaction mixture along with additional water required to obtain a workable mixture. When clay is added, the clay will be included in amounts which will produce from about 10 to 25 percent by weight clay in the finished catalyst composition.

In step (2) the silica-alumina cogel slurry obtained in step (1) is combined with additional sodium aluminate solution to obtain a gelled slurry having a pH of about 11.8 to about 12.3 and preferably from about 11.8 to 12.2. The quantity of sodium aluminate added at this point constitutes from about 28 to 35 percent by weight and preferably 30 percent by weight of the alumina present in the finished hydrogel matrix. The gelled slurry at step (2) will contain from about 0.20 to 0.25 mols excess $Na_2O$/mol $SiO_2$-$Al_2O_3$.

As shown in step (3) of FIG. 1, the gelled slurry of step (2) is then combined with additional aluminum sulfate to produce an acid gel slurry having a pH of from about 3.5 to 3.9. At this point, sufficient aluminum sulfate is added to provide an overall silica-alumina ratio in the gel slurry of from about 4 to 2.

In step (4) as shown in FIG. 1, the acid gelled slurry of step (3) is then combined with a sodium Type Y zeolite crystallization mother liquor that results from synthesis of Type Y zeolite by processes such as disclosed in U.S. Pat. Nos. 3,639,099, 3,130,007 and 3,808,326. Using the procedure of 3,639,099 the overall molar composition of the Type Y zeolite reaction mixture slurry preferably ranges from about 3 to 6 $Na_2O$; 6 to 12 $SiO_2$;$Al_2O_3$; 120 to 200 $H_2O$. The mother liquor component will contain from about 3.5 to 4.5 mols unreacted silicate and 1.5 to 2.5 mols free $Na_2O$ and 90 to 140 mols $H_2O$. The zeolite reaction mixture is preferably diluted with additional water to obtain a mother liquor component having the following mol ratio of ingredients: 1.5 to 2.5 Na$_2$O; 3.5 to 4.5 SiO$_2$: 200 to 300 H$_2$O. As indicated above, sufficient zeolite reaction slurry mother liquor is added to the acid gel slurry of step (3) to obtain a catalyst slurry at step (4) which has a pH of from about 3.8 to 4.5 and preferably about 3.9 to 4.1. When zeolite is added along with its mother liquor the quantity of sodium Y reaction mixture preferably added is sufficient to impart from about 5 to 50 and preferably 10 to 20 percent by weight sodium Type Y zeolite to the overall finished catalyst composition.

While in a preferred practice of the invention the zeolite component is added as sodium type Y together with its diluted mother liquor component, it is also contemplated that the mother liquor component may be separated from the zeolite synthesis and added at step (4) without the zeolite. The catalyst resulting from such a procedure may contain no zeolite, or alternatively, a thermally treated and/or ion exchanged ultrastable (Z14US), calcined rare earth exchanged (CREX or CREY) zeolite such as disclosed in U.S. Pat. Nos. 3,293,192, 3,402,996, 3,449,070, 3,518,051, 3,595,611, 3,607,043 may be added in amounts ranging from about 5 to 50 percent by weight of the finished catalyst.

As shown in step (5) of the flow chart of FIG. 1, the catalyst slurry obtained at step (4) is subjected to a conventional catalyst finishing procedure which includes recovering the hydrogel zeolite catalyst particles by filtration, washing to remove soluble ions including soluble soda and sulfate; forming the catalyst by procedures such as spray drying to obtain fluidizable catalysts having particle size ranging from about 20 to 80 microns or pelleting to obtain moving bed catalysts having a particle size which ranges up to about 3.5 mm in diameter; ion exchanging with ammonium, hydrogen or non-alkaline metal ions such as rare-earth ions; and finally drying to obtain a catalyst having a total volatiles content of below about 20 percent by weight. The catalyst of the present invention may contain from about 1.5 to 5 percent by weight metal ions such as calcium, magnesium and rare earth, and optionally the catalyst may contain noble metal ions such as platinum and palladium in amounts ranging from about 1 to 20 parts per million, which are added for the purposes of providing octane enhancement of the cracked gasoline fractions or to enhance the CO/SOx oxidation capabilities of the catalyst during regeneration.

The catalyst obtained by the practice of the present invention will typically comprise from about 0 to 25 percent by weight clay, and/or alumina such as alpha alumina tri-hydrate, from about 5 to 50 percent by weight crystalline alumina silicate zeolite and from about 1.5 to 5 percent by weight stabilizing metal ions. Our catalysts possess a unique pore size distribution which is illustrated in the graph set forth in FIG. 2. As shown in FIG. 2, wherein the pore diameter of the catalyst is plotted against a change in surface/change in pore diameter, the catalyst of the present invention possesses a substantial surface area in pores ranging from about 25 to 75 A°. The solid line set forth in FIG. 2 depicts the pore volume pore size distribution of the catalyst which has been subjected to drying for 3 hours at about 538° C. The dash line depicts the pore size distribution of the catalyst after steam deactivation for 5 hours at 827° C. using 20 percent steam atmosphere. It is noted by comparing the pore size distribution of the catalyst before and after steam deactivation that the pore size distribution characteristic of the deactivated catalyst is retained (at reduced magnitude). Thus, the catalysts of the present invention are capable of retaining significant surface area in pores of 25 to 75 A° after severe steam deactivation. This stability to steam indicates that the catalyst will possess a substantial activity and stability during use as a hydrocarbon conversion catalyst.

The overall surface area of the catalyst will range from about 120 to 250 m$^2$/g. It is to be understood that the matrix of the catalyst will possess a surface area of from about 60 to 190 m$^2$/g and zeolite component will contribute a surface area in proportion to the quantity of zeolite added. The catalyst produced in accordance with our invention will possess a high attrition resistance which will range from about 8 to 28 DI, i.e. Davison Index, and from about 0.5 to 2.8 JI, i.e. Jersey Index.

The Davison Index, obtained by the procedure outlined in U.S. Pat. No. 3,650,988 is used to measure the resistance to attrition. It is a measure of the hardness of a catalyst or how well it resists wearing under test conditions. A catalyst that possesses a low Davison Index will last longer than a catalyst that has a high Davison Index. In addition, a catalyst having a poor resistance to attrition will produce fines that may escape the oil refinery thereby leading to environmental pollution problems. The Davison Index, as set forth in U.S. Pat. No. 3,650,988 is a measure of the percent of 0–20 micron particles formed by attrition from 20+ micron particles under test conditions. It is found by subtracting the percent 0–20 micron particles present in the original sample from the percent 0–20 micron particles found in the attrited sample. Then, dividing by the original percent 20+ fraction times 100 gives percent 0–20 micron particles made under test conditions. The Jersey Index (JI) is found by dividing the weight of the 0–16 micron particles formed during the 4 hour portion of the total 5⅓ hour Davison Index test by four to obtain the weight per hour of fines produced. This is divided by the total weight of all the fractions times 100 to yield a weight percent of 0–16 micron particles produced per hour under test conditions.

The calculation of these parameters may be represented as follows:

$$\text{Davison Index} = \frac{A - B}{C} \times 100 = \text{Percent 0–20 micron particles formed by attrition from 20+ micron particles under test conditions.}$$

A = % 0–20 micron particles found in sample after 5⅓ hours of running under test conditions.
B = % 0–20 micron particles found in the original sample.
C = % 20+ micron particles remaining after removal of 0–20 micron fraction.

The 0–°micron particles made under test conditions is found as follows:
0–16 micron fraction 30 minutes run time
+0–16 micron fraction 30 minutes run time
+0–16 micron fraction 4 hours run time.
16–20 micron fraction 20 minutes run time.

The Jersey Index is then the grams of 0–16 micron particles made during the 4 hour period divided by four times 100 and this is then divided by the total weight of all the fractions to yield the weight percent 0–16 micron particles generated per hour under test conditions.

Then if (D) represents the 0–16 micron fraction generated during 4 hours of run time and (E) represents the total weight of all fractions, the JI is calculated as follows:

$$JI = \frac{D \times 100}{4E} = \text{Wt. \% 0-16 micron particles generated/hour under test conditions.}$$

Furthermore, the catalyst of the present invention will possess a substantial activity for the conversion of hydrocarbons which typically ranges from about 65 to 80 percent as determined by the activity procedures set forth by Ciapetta and Henderson in Oil and Gas Journal, Oct. 6, 1967.

Having described the basic aspects of the present invention, the following examples are given to illustrate specific embodiments thereof.

EXAMPLE 1

A sodium Type Y zeolite reaction mixture was prepared by a procedure similar to that set forth in Examples 1 and 2 of U.S. Pat. No. 3,639,099. The final reaction mixture subsequent to crystallization and dilution with water had the following mol ratio composition:
3.15 $Na_2O$: 9.15 $SiO_2$: $Al_2O_3$: 345 $H_2O$. The type Y zeolite had a $SiO_2/Al_2O_3$ ratio of 4.9, and the mother liquor had a mol ratio composition of:
2.5 $Na_2O$: 4.25 $SiO_2$: 276 $H_2O$.

EXAMPLE 2

A catalyst of the present invention was prepared using the procedure generally outlined in FIG. 1. Specifically, sodium silicate, sodium aluminate and aluminum sulfate solutions were prepared as follows:

(a) A solution of sodium silicate containing 4.0 percent by weight $SiO_2$ and 1.4 percent by weight $Na_2O$ and having a specific gravity of 1.038 at 35° C. was prepared by diluting a 41°Bé sodium silicate solution which contained 28.7 percent $SiO_2$ and had a $SiO_2/Na_2O$ weight ratio of 3.22 (3.33 molar ratio).

(b) A sodium aluminate solution was prepared by adding 10,667 g. of NaOH pellets to 20 liters of water and then adding an aluminum trihydrate to the agitated solution. After addition of the aluminum trihydrate, the mixture was boiled (~116° C.) for about 30 minutes after initial dissolution of the trihydrate.

(c) A concentrated aluminum sulfate solution which has a concentration of 77.2 g. $Al_2O_3$/l was prepared by dissolving 504 g. of aluminum sulfate $(Al_2(SO_4)_3 \cdot 18H_2O)$ in sufficient water to obtain one liter of solution. A dilute aluminum sulfate solution, containing 28 g. $Al_2O_3$/liter was obtained by diluting 362.7 ml of the concentrated solution (77.2 g. $Al_2O_3$/liter) with sufficient water to obtain each liter of dilute solution.

A sodium silicate solution/clay slurry was prepared by adding clay to the sodium silicate solution prepared in (a) above. This slurry contained 21.1 g. $SiO_2 \cdot Al_2O_3$ basis clay per liter. The slurry was pumped into a centrifugal pump reactor at about 3785 ml/min. Co-incidentally, the dilute aluminum sulfate solution prepared in (c) above was pumped into the same centrifugal pump reactor at the rate of about 600 ml per minute. About 62 percent of the equivalents of $Na_2O$ present in the sodium silicate solution were neutralized by the presence of aluminum sulfate to produce a semi-rigid gel in about 1.5 minutes. The pH of the gelled slurry at this point was 9.2. The slurry was aged for 15 minutes at 35° C. The gelled slurry was combined with 1853 g. of hot (82° C.) sodium aluminate solution containing 24 percent by weight of $Al_2O_3$ prepared in (b) above. After addition of the sodium aluminate, which represented 30 percent of the total synthetic $Al_2O_3$ as $Al_2O_3$ from sodium aluminate, the Ph increased from about 9.2 to 12.1. The resultant slurry was then aged, with agitation, for 15 minutes after which time the slurry pH was 12.0. Then, 10,088 ml of aluminum sulfate solution (77.2 g. $Al_2O_3$/liter) was added to the slurry which caused the pH to drop to 3.8. The resulting acidic gelled slurry was then aged for 20 minutes after which time the pH was 3.7 and was at a temperature of 35° C.

28,483 g. of a slurry of sodium type Y zeolite/mother liquor prepared in Example 1, was added to the acid gelled slurry. The zeolite slurry was added in sufficient amounts to yield a zeolite content in the catalyst of 14.5 percent on a $SiO_2$-$Al_2O_3$ basis. The slurry contained 11.5 percent solids. The attendant mother liquor, added with the zeolite slurry, contained about 19.2 percent of the total $SiO_2$ used in the catalyst preparation. This amount of $SiO_2$ from mother liquor represents 8.7 percent of the finished catalyst on a $SiO_2$-$Al_2O_3$ basis. The pH of the catalyst slurry after addition of the sodium zeolite slurry containing mother liquor was 4.2.

The catalyst slurry was then filtered under vacuum. The resulting filter cake was reslurried with water to the level of 12 percent solids. This slurry was then spray dried using an inlet air temperature of 216° C. and an outlet air temperature of 149° C. The resultant microspheres, nominally in the particle size range of 20–80 microns in diameter, were reslurried in hot (66° C. deionized water at about 20 percent solids and then filtered under vacuum. The filter cake was washed with ammonium sulfate and deionized water. The washed slurry was exchanged with rare earth chloride solution which contained 10 g of $RECl_3 \cdot 6H_2O$ per 100 g. of dry weight basis catalyst at a pH of 4.8 to 5.0. After rare earth exchange, the catalyst slurry with filtered under vacuum, then washed three times each with hot (66° C.) water which was pH adjusted to 6.0–7.0 with dilute ammonium hydroxide solution. The washed and exchanged catalyst was then dried in a forced draft oven for 16 hours at 177° C.

EXAMPLE 3

To illustrate the superior qualities of the present catalyst with those of a prior art catalyst a conventional catalyst was prepared as follows:

A sodium silicate solution containing 4.0 percent by weight silica which possesses a formula of $Na_2O(SiO_2)3.2$, is combined with an aluminum sulfate solution. Sufficient aluminum sulfate is added to neutralize about 55 percent by weight of the $Na_2O$ in the silicate solution and to obtain a pH of about 9.5 to 10.0. The mixture was then aged for 15 minutes at 35° C. Subsequently, a portion of sodium aluminate solution containing 24 percent by weight of $Al_2O_3$ was added to the slurry. This portion represented 25 percent of the total synthetic $Al_2O_3$ addition to the catalyst. The resultant pH, after this addition, was 11.5. This slurry was then further aged at 35° C. for 15 minutes after which the remaining $Al_2O_3$ required to form a 25 percent $Al_2O_3$ matrix was added in the form of aluminum sulfate solution containing 77.2 g. $Al_2O_3$ per liter. At this point the pH was 4.2. The slurry was then aged for 20 minutes at 35° C. The pH of the slurry was raised to 6.0 with addition of 28 weight percent ammonium hydroxide solution and aged for 5 minutes with agitation. A portion of commercially available NaY zeolite, that is, a synthetic Y type sodium faujasite having a silica to alumina ratio of 4.9, was added to the slurry. The amount of NaY zeolite added represented 15.7 percent of the catalyst on a silica-alumina basis. The catalyst mixture was then filtered under vacuum to obtain a catalyst cake. This cake was then reslurried in water to about 12 percent solids and then spray dried to form microspheres at an inlet temperature of 357° C. and an outlet temperature of 149° C. The spray dried microspheroidal catalyst was then washed and ammonium sulfate and rare earth exchanged according to the procedure outlined in Example 2.

EXAMPLE 4

To compare attrition resistance, density, catalytic activity and thermal stability of the catalysts prepared in Examples 2 and 3, the catalysts were subjected to standard microactivity testing subsequent to steam deactivation and to attrition resistance determinations. The comparison of the physical and catalytic properties of the catalyst is set forth in the table below:

TABLE

| Catalyst (Example) | 2. | 3. |
|---|---|---|
| Components (wt. %) | | |
| Silica alumina hydrogel | 67. | 62. |
| Zeolite | 14.5 | 15.7 |
| Clay | 18.5 | 22.3 |
| Chemical Composition (wt. %) | | |
| $Al_2O_3$ | 30.4 | 27.8 |
| $Na_2O$ | 0.40 | 0.43 |
| $SO_4$ | 1.02 | 0.17 |
| $RE_2O_3$ | 3.76 | 4.57 |
| Physical Properties | | |
| Surface area (m$^2$/g) | 135. | 277. |
| Pore Volume ($n_2$-cc/g) | 0.09 | 0.36 |
| Pore Volume ($h_2O$-cc/g) | 0.19 | 0.45 |
| Bulk Density (g/cc) | 0.68 | 0.55 |
| Compacted Density (g/cc) | 0.91 | 0.72 |
| Attrition | | |
| Davison Index (DI) | 12. | 25. |
| Jersey Index (JI) | 1.1 | 2.8 |
| Catalytic Properties | | |
| Activity (vol. % conversion) | 70. | 67. |

Catalytic activity of the catalysts was determined using the microactivity test outlined by Ciapetta and Henderson, Oil and Gas Journal, Oct. 6, 1967. The catalyst samples were first subjected to a 3 hour 538° C. thermal treatment and an 8 hour 732° C., 15 psig steam treatment and tested at 482° C. using a 16 weight hour space velocity (WHSV) and 3 catalyst to oil ratio and a light West Texas Devonian Oil fraction boiling at 260° to 427° C. Review of the data set forth in the Table indicates that the catalyst prepared by way of novel procedure set forth in Example 2 possesses superior attrition resistance, density and activity over a catalyst prepared by the process set forth in Example 3.

EXAMPLE 5

To illustrate the unique pore structure and superior hydrothermal stability of our catalysts, the pore size distribution (PSD) characteristics of the novel catalyst of Example 2 was compared with the characteristics of a commercial catalyst prepared by a method similar to that set forth in Example 3. The data is generally summarized in the graph set forth in FIG. 2. The solid lines represent the PSD curves for the catalyst of Example 2 both after drying at 538 (upper curve) and after steaming at 827° C. in 20 percent steam for 5 hours (lower curve). The dash lines represent similar data obtained from testing the commercial catalyst. The data set forth in FIG. 2 clearly illustrates that the catalyst of the present invention possesses a substantial pore structure at about 35 A° pore diameter both before and after hydrothermal treatment, whereas the commercial catalyst loses most all of the 35 A° pore structure after similar treatment.

The above description and specific examples and drawings clearly indicate that valuable catalysts may be obtained by practice of the present invention.

We claim:

1. A process for preparing a silica-alumina hydrogel catalyst which comprises:
    (a) preparing a silica-alumina cogel by reacting sodium silicate, aluminum sulfate and water to obtain a cogel slurry having a pH of about 9.0 to 9.6;
    (b) reacting said cogel slurry of step (a) with sodium aluminate to obtain a silica-alumina gel slurry having a pH of about 11.8 to 12.3;
    (c) reacting the gel slurry of step (b) with aluminum sulfate to produce an acid gel slurry having a pH of about 3.5 to 3.9;
    (d) reacting the acid gel slurry of step (c) with a sodium silicate containing mother liquor obtained from synthesis of sodium Y zeolite to obtain silica-alumina hydrogel catalyst slurry having a pH of about 3.8 to 4.5; and
    (e) recovering the catalyst obtained in step (d).

2. The process of claim 1 wherein the said catalyst is recovered by filtration and the recovered composite is washed, spray dried and ion exchanged to lower the $Na_2O$ content thereof to below about 1 percent by weight.

3. The process of claim 1 wherein said catalyst contains from about 10 to 25 percent by weight kaolin added at step (a).

4. The process of claim 1 wherein said catalyst contains from about 5 to 50 percent by weight NaY zeolite added with the mother liquor at step (d).

5. The process of claim 4 wherein said catalyst is exchanged with ions selected from the group consisting of ammonium, hydrogen, rare-earth, calcium, magnesium and mixtures thereof.

6. The process of claim 1 wherein a zeolite selected from the group consisting of thermally treated and/or ion exchanged zeolites is added at step (d).

7. A catalyst obtained by the process of claim 1 wherein said silica-alumina gel component is characterized by a substantial surface area in pores of about 25 to 75 A° in diameter.

* * * * *